United States Patent
Barrett et al.

[11] Patent Number: 6,005,990
[45] Date of Patent: *Dec. 21, 1999

[54] SYSTEM FOR OPTICALLY SCANNING IMAGES USING OPTICAL SHUTTER

[75] Inventors: Robert Carl Barrett; Erhard Theodor Schreck, both of San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/661,265

[22] Filed: Jun. 10, 1996

[51] Int. Cl.⁶ .............................. G06K 9/20; G06K 9/28
[52] U.S. Cl. ..................... 382/323; 382/266; 358/483; 358/484; 358/514
[58] Field of Search ...................... 382/312, 266, 382/317, 318, 321, 323, 264; 358/474, 482, 483, 484, 494, 513, 514; 250/208.1; 349/33, 34, FOR 107, FOR 127; 348/272, 276, 277, 280, 281, 282, 294, 296, 302, 311

[56] References Cited

U.S. PATENT DOCUMENTS

| | | | |
|---|---|---|---|
| 4,324,977 | 4/1982 | Brauer | 250/222 |
| 4,739,377 | 4/1988 | Allen | 355/133 |
| 4,770,265 | 9/1988 | Allen | 180/140 |
| 4,771,338 | 9/1988 | Fujiwara | 358/474 |
| 4,809,061 | 2/1989 | Suzuki | 358/514 |
| 4,810,058 | 3/1989 | Sangyoji et al. | 350/331 |
| 4,915,486 | 4/1990 | Hansen | 350/171 |
| 4,956,547 | 9/1990 | Mita | 250/208.1 |
| 4,992,828 | 2/1991 | Liston | 355/202 |
| 5,117,245 | 5/1992 | Gordon | 346/160 |
| 5,164,832 | 11/1992 | Halvis et al. | 348/250 |
| 5,173,793 | 12/1992 | Purcell | 359/85 |
| 5,194,729 | 3/1993 | Okisu et al. | 250/222.1 |
| 5,220,377 | 6/1993 | Suzuki et al. | 355/27 |
| 5,227,906 | 7/1993 | Tokumitsu | 359/117 |
| 5,253,091 | 10/1993 | Kimura et al. | 359/55 |
| 5,267,045 | 11/1993 | Stroomer | 358/241 |
| 5,270,840 | 12/1993 | Ogata et al. | 358/482 |
| 5,300,976 | 4/1994 | Lim et al. | 354/219 |
| 5,315,413 | 5/1994 | Yamamoto et al. | 358/512 |
| 5,337,173 | 8/1994 | Atsumi et al. | 359/54 |
| 5,343,311 | 8/1994 | Morag et al. | 358/518 |
| 5,347,115 | 9/1994 | Sherman et al. | 235/472 |
| 5,359,345 | 10/1994 | Hunter | 345/102 |
| 5,367,362 | 11/1994 | Forest | 355/208 |
| 5,406,323 | 4/1995 | Tanigaki et al. | 348/15 |
| 5,412,419 | 5/1995 | Ziarati | 348/61 |

(List continued on next page.)

OTHER PUBLICATIONS

C. Cromar, "Characterizing and Tracking Liquid Crystal Display Panel Defects," *IBM Technical Disclosure Bulletin*, vol. 36, No. 11, Nov. 1993, pp. 659–661.

D. McBride, J. Mosley and W. N. Zalph, "Electronic Book with Single–Line Display," *IBM Technical Disclosure Bulletin*, vol. 36 No. 12, Dec. 1993, pp. 1–2.

*Primary Examiner*—Amelia Au
*Assistant Examiner*—Timothy M. Johnson
*Attorney, Agent, or Firm*—Gray Cary Ware Freidenrich

[57] ABSTRACT

An image is optically scanned by projecting the image onto an optical sensor through an optical shutter. In an exemplary embodiment, the image is projected through the optical shutter while the shutter is made substantially opaque except for a selected substantially transparent group of contiguous pixels. Then, the contents of the document are scanned by advancing this group of pixels across the shutter in a predetermined pattern. The shutter, for example, may comprise an LCD screen. To scan a document, the document is first placed against the shutter. As a light source directs light through the document and the shutter, the shutter is made substantially opaque except for a selected substantially transparent group of contiguous pixels. Then, the contents of the document are scanned by advancing this group of pixels across the shutter in a predetermined pattern. The document may be placed against either side of the shutter—near the light source or near the optical sensor.

52 Claims, 10 Drawing Sheets

U.S. PATENT DOCUMENTS

| | | | |
|---|---|---|---|
| 5,412,595 | 5/1995 | Shannon | 365/108 |
| 5,448,260 | 9/1995 | Zenda et al. | 345/100 |
| 5,452,385 | 9/1995 | Izumi et al. | 385/37 |
| 5,453,618 | 9/1995 | Sutton et al. | 250/334 |
| 5,461,397 | 10/1995 | Zhang et al. | 345/102 |
| 5,463,217 | 10/1995 | Sobol et al. | 250/234 |
| 5,468,952 | 11/1995 | Alexander et al. | 235/492 |
| 5,589,687 | 12/1996 | Kawata et al. | 250/338.3 |
| 5,664,231 | 9/1997 | Postman et al. | 395/893 |
| 5,841,553 | 11/1998 | Neukermans | 358/494 |

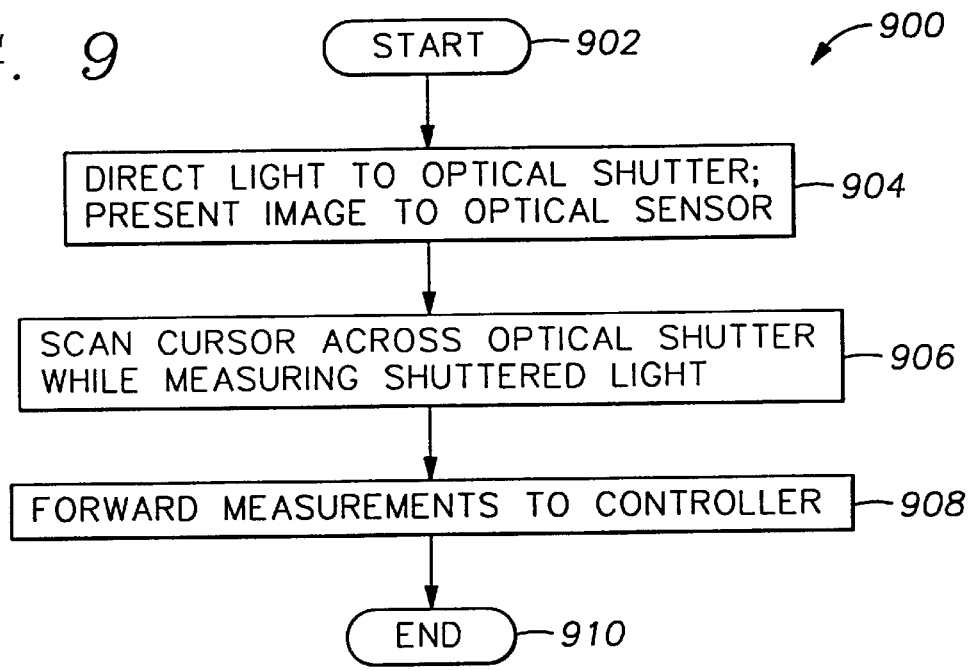
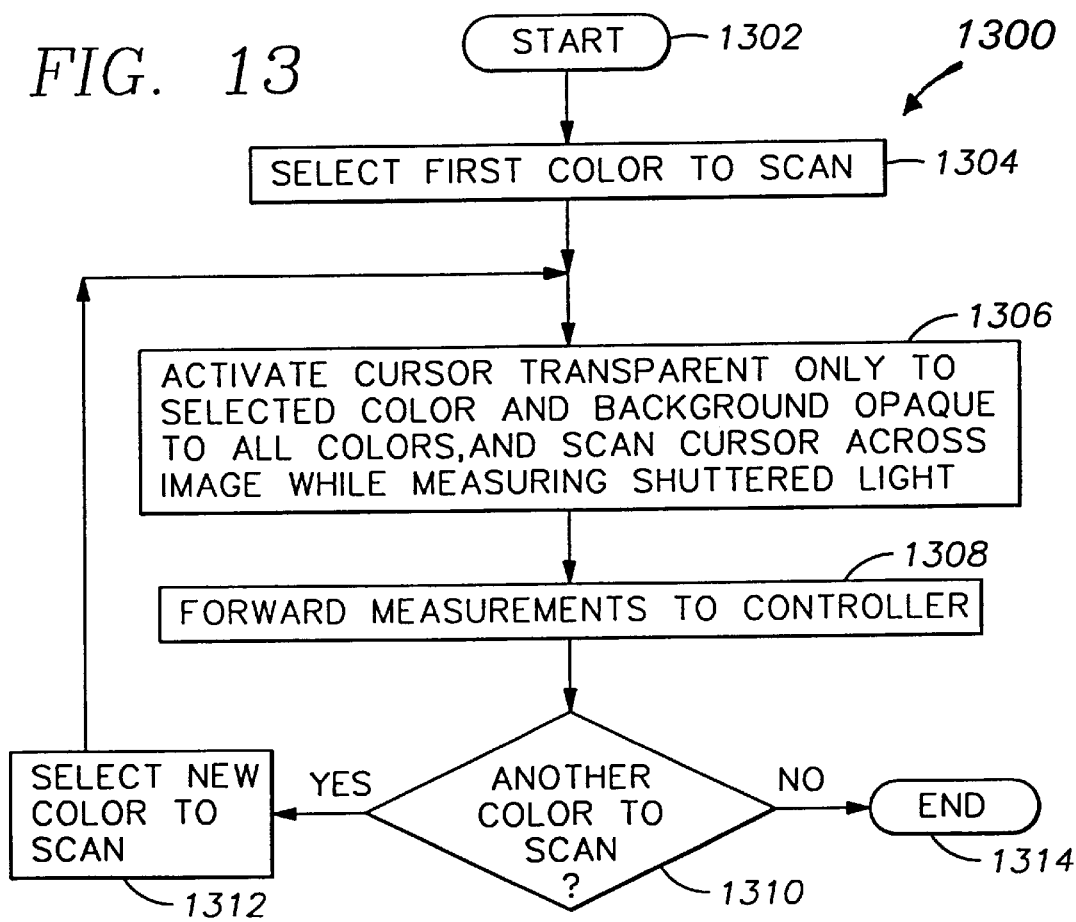

SYSTEM FOR OPTICALLY SCANNING IMAGES USING OPTICAL SHUTTER

BACKGROUND OF THE INVENTION

1. Field of the Invention

The present invention relates to optical image scanning systems. More particularly, the invention concerns an optical image scanning method and apparatus where an image is scanned by projecting it onto an optical sensor through an optical shutter.

2. Description of the Related Art

In processing data, a crucial step frequently involves introducing the data into the computer. Data is entered into computers using keyboards, computer mice, modems, touch screens, and other peripheral devices. Furthermore, many modern offices conveniently employ optical scanners.

Scanning is sometimes significantly less convenient, however, for travelers. Although suitable for use in the office, high quality scanners can be bulky and heavy. And, although lower resolution scanners are commercially available, their output may fall short of some users' needs. Furthermore, even the reduced bulk and weight of portable scanners may still be too much for some travelers who are also carrying laptop computers, cellular telephones, briefcases, luggage, and the like.

SUMMARY OF THE INVENTION

Broadly, the present invention concerns a method and apparatus for optical image scanning by presenting the image to an optical sensor via an optical shutter. The optical shutter, for example, may comprise an LCD screen. In one embodiment, a document is first placed against the optical shutter. As light is directed through the document and the optical shutter, the optical shutter is made substantially opaque except for a selected substantially transparent group of contiguous optical shutter pixels. Then, the contents of the document are scanned by advancing this group of pixels across the screen in a predetermined pattern.

In one embodiment, the invention may be implemented to provide an image scanning apparatus. Alternatively, another implementation of the invention concerns a method for scanning images. Another example of the invention is an article of manufacture (such as a computer diskette, memory circuit, CD ROM, etc.) readable by a digital processor to perform method steps to scan an image.

The invention affords its users with a number of distinct advantages. Chiefly, the invention may be implemented by efficiently using pre-existing hardware components. In one embodiment, for example, the scanner of the invention may be constructed by combining optical shutter, backlighting source, and CPU of a laptop computer with an optical sensor. The invention may be used to scan normal business documents or even "invisible" documents. In this respect, the scanner of the invention may be used for scanning and verifying the authenticity of paper currency.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 9 is a flowchart of an illustrative image scanning method pursuant to the invention;

FIG. 13 is a flowchart of an illustrative color image scanning method pursuant to the invention;

DETAILED DESCRIPTION OF THE PREFERRED EMBODIMENTS

Broadly, the invention concerns methods, apparatuses, and articles of manufacture for optically scanning images, where the images are scanned by presenting them to an optical sensor via an optical shutter.

STRUCTURE

Figure 1:
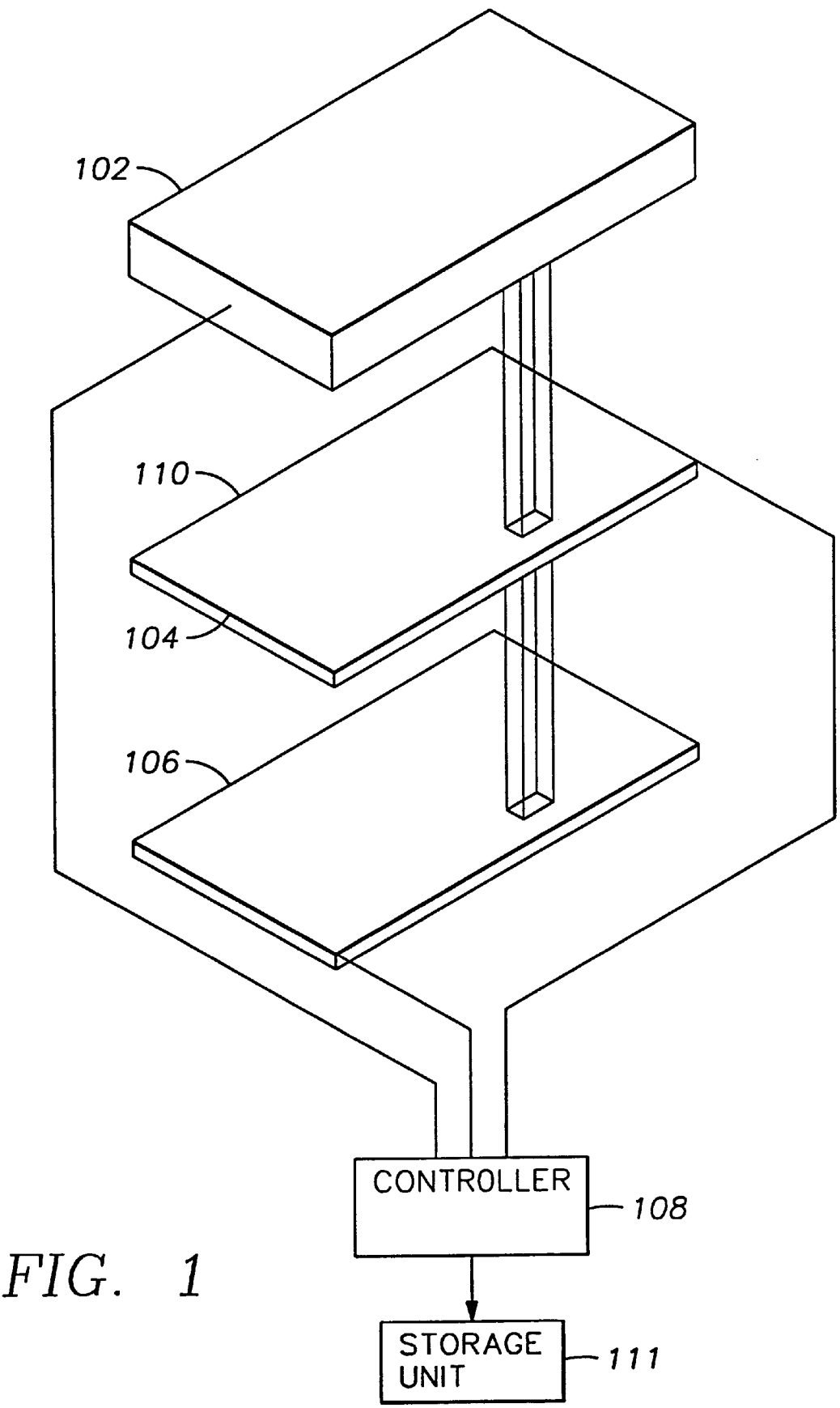
FIG. 1 is an overall diagram of the hardware components and interconnections of an optical scanning system of the invention.

One aspect of the present invention concerns an image scanning apparatus 100, the hardware components and interconnections of which are described in FIG. 1. The basic components of the invention include a light source 102, a optical shutter 104, an optical sensor 106, and a scanner controller 108. The light source 102 and optical shutter 104 cooperatively "present" an image to the optical sensor 106. More particularly, as the light source 102 projects light onto the optical shutter 104, the shutter 104 creates a "scanning cursor" that traverses across the shutter 104 in a predetermined scanning pattern. An image to be scanned is introduced by placing an object between the sensor 106 and shutter 104, placing an object between the shutter 104 and light source 102, or by using the light source 102 to generate the image. The optical sensor 106 senses portions of the image passing through the optical shutter 104, and creates an electronic representation of the scanned image.

As shown in FIG. 1, the scanner controller 108 is electrically coupled to the optical sensor 106 and the optical shutter 104. If desired, the controller 108 may also be electrically coupled to the light source 102 for the purpose of exerting computer control over operation of the light source 102. The light source 102 is positioned relative to the optical shutter 104 to project a pattern of light that evenly covers the shutter 104. The optical sensor 106 is positioned beneath the optical shutter 104 with respect to the light source 102, such that the sensor 106 can receive light passing from the source 102 through any region of the shutter 104. As described in greater detail below, these components may be advantageously and conveniently integrated into a laptop computer, as an example of one embodiment.

Light Source

The light source 102 comprises a source of light adequate to project an evenly distributed pattern of light over the shutter 104. In the laptop computer embodiment, the source 102 may comprise a backlight from a laptop computer such as an IBM THINKPAD™ MODEL 755cv. THINKPAD is a trademark of IBM Corporation. Alternatively, the source 102 may comprise another incandescent or fluorescent lamp, optionally with a light diffuser of the type used in laptop computers. In different embodiments, ambient room lighting or ambient outdoor light may even be used. The light created by the source 102 may be in a range that is either visible or invisible to humans, depending upon the desired application, as discussed in greater detail below.

In one embodiment, the light source 102 projects light through an object or other document to create an image for scanning. Here, the light source 102 may simply comprise a lamp, as described above.

In a different embodiment, the source 102 comprises an image projector that creates and projects an image for scanning. Here, no physical document is scanned, since the source 102 itself creates the image upon the optical shutter 106. The light source 102 in this embodiment therefore comprises a static image projection device that produces images known in the optics field as "real" images.

Optical Shutter

The optical shutter 104 comprises an assembly of individually controlled, electronically activated shuttering elements. Each shuttering element may be activated and de-activated in response to signals from the scanner controller 108. When activated, a shuttering element exhibits a first light transmissive quality; when de-activated, the shuttering element exhibits a second light transmissive quality. As an example, the first light transmissive quality may constitute an opaque black color, and the second light transmissive quality may constitute complete transparency. Furthermore, in certain appropriate applications each shuttering element may provide a variety of different light transmissive qualities, e.g. multiple colors, colors invisible to humans, etc.

In the laptop computer embodiment, the optical shutter 104 preferably comprises an LCD screen, where the assembly of shuttering elements comprises an array of LCD pixels. The LCD screen in this embodiment may provide a black-and-white display, or a display of different colors. With a black-and-white ("b/w") display, the first light transmissive quality is an opaque black color; the second light transmissive quality is transparency, where pixels may appear "white" due to white fluorescent backlighting. With a color display, each pixel actually includes multiple sub-pixels of different colors, which may be activated separately or in combination to provide a desired color. The construction and operation of b/w and color video screens, such as LCD screens, is well known.

The optical shutter 104 is preferably connected to the controller 108 through a graphics driver or another suitable means.

Optical Sensor

The optical sensor 106 comprises an optical sensing device responsive to the wavelength(s) of light produced by the light source 102. The sensor 106 utilizes photosensitive materials, which may be implemented in a number of different forms, such as photodiodes, phototransistors, solar-type cells, pyroelectric plastic polymer films, etc. In the laptop computer implementation, the optical sensor 102 may comprise a detachable component of the system 100, where the sensor 102 is coupled to the controller 108 through a ribbon cable, expansion card, PCMCIA card, etc.

The sensor 106 may comprise a monolithic sensor, segmented monolithic sensor, rectangular photosensor array, circular photosensor array, or another suitable sensor arrangement, discussed as follows.

A. Optical Sensor: Monolithic Sensor

Figure 2:
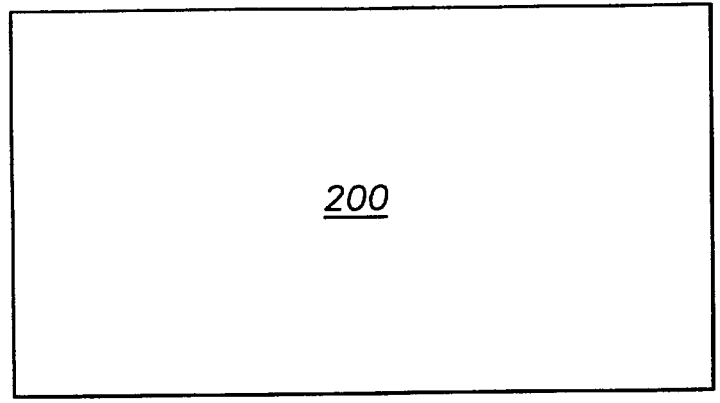
FIG. 2 is a diagram of a single monolithic sensor, showing one embodiment of an optical sensor pursuant to the present invention.

With the monolithic sensor configuration (FIG. 2), the optical sensor 106 comprises a single contiguous sensing area 200 that produces an output signal proportional to the sum of all light striking that area at any time. This sensor 200 does not indicate where the light was received on the area 200. Accordingly, five separate light beams of a given strength would provide the same output as a single light beam five times stronger.

The monolithic sensing area 200 may be provided by a large solar-type cell, a pyroelectric sheet, or a similar thin-film sensing element.

B. Optical Sensor: Monolithic Strips

The configuration of monolithic strips (FIG. 3) is one type of segmented monolithic optical sensor. Here, the optical sensor 106 uses multiple contiguous sensing areas 300–303, each spanning the height (as illustrated) or width (not shown) of the sensor 106. Each sensing area 300–303 produces an output signal proportional to the sum of all light striking that area at any time. Like the monolithic sensor 200, each sensor 300–303 does not indicate where the light was received on the area 300–303. However, light received by any one of the sensors 300–303 can be distinguished from light received by another sensor 300–303.

The monolithic strips 300–303 may be provided by a corresponding number of solar-type cells, pyroelectric sheets, or similar thin-film sensing elements.

C. Optical Sensor: Monolithic Mosaic

The monolithic mosaic (FIG. 4) is another type of segmented monolithic optical sensor. Like the monolithic strips 300–303 (FIG. 3), the monolithic mosaic configuration (FIG. 4) uses multiple contiguous sensing areas 400–407, each producing an output signal proportional to the sum of all light striking that area at any time. However, the monolithic mosaic configuration contemplates a patchwork of strips, whose size, shape, and number are chosen to suit a particular application. For instance, one approach uses a simple rectangular arrangement of monolithic sensing areas 400–407, as illustrated. Preferably, the sensing areas are as numerous as feasible, to increase the signal-to-noise ratio in each sensing area.

Like the other monolithic-type sensors, each sensing area 400–407 does not indicate where the light was received on the area 400–407. However, light received by one of the sensing areas 400–407 can be distinguished from light received by another one of the sensing areas 400–407.

The monolithic strips 400–407 may be provided by a corresponding number of solar-type cells, pyroelectric sheets, or a similar thin-film sensing elements.

D. Optical Sensor: Rectanoular Photosensor Array

With a rectangular photosensor array (FIG. 5), the optical sensor 106 comprises multiple independent photosensors, such as the sensor 500. Each such sensor produces an output signal proportional to the light striking it at any time. Each sensor may correspond to one shuttering element of the optical shutter 104, multiple shuttering elements, or even a sub-portion of one shuttering element, depending upon the needs of the application.

The photosensors of the rectangular array may be provided by photodiodes, phototransistors, CCD elements, or other suitable light sensing elements.

E. Optical Sensor: Circular Arrangement

Figure 3:
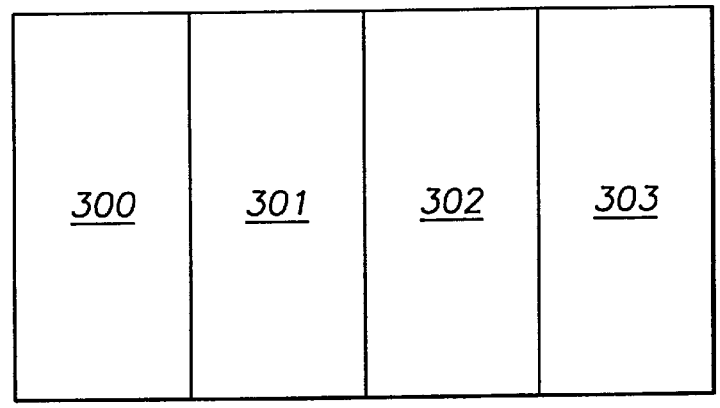
FIG. 3 is a diagram of monolithic sensor strips, showing another embodiment of an optical sensor pursuant to the present invention.
Figure 4:
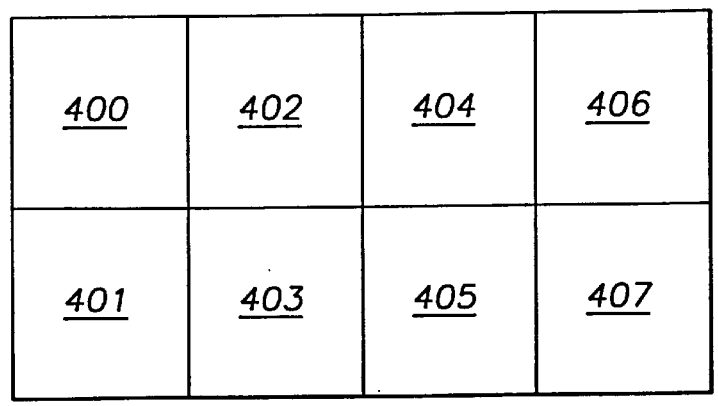
FIG. 4 is a diagram of a monolithic sensor mosaic, showing another embodiment of an optical sensor pursuant to the present invention.
Figure 5:
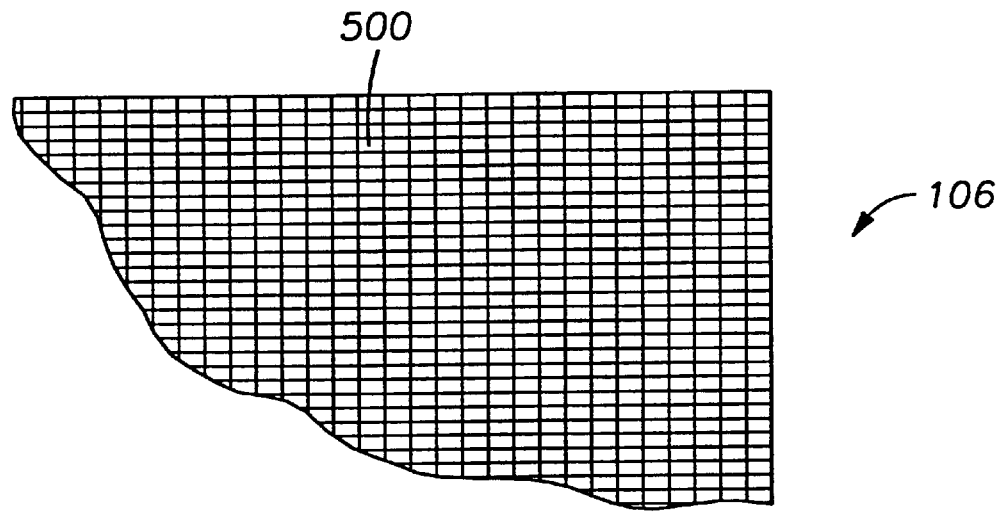
FIG. 5 is a diagram of a rectangular photosensor array, showing another embodiment of an optical sensor pursuant to the present invention.
Figure 6:
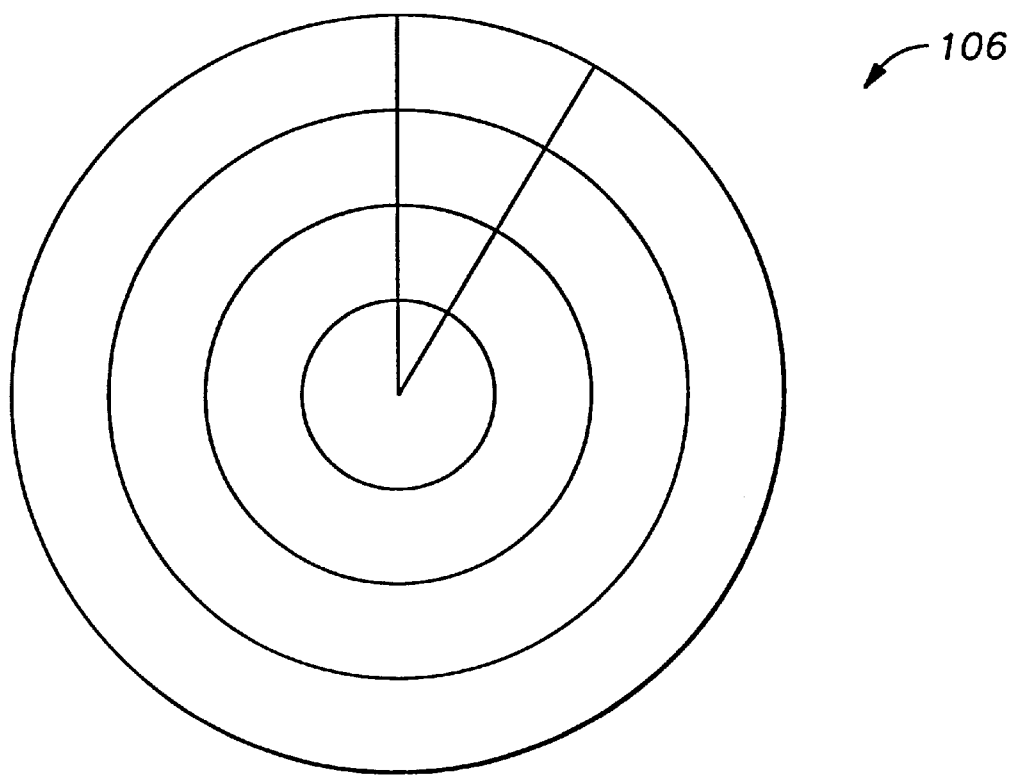
FIG. 6 is a diagram of a circular photosensor array, showing another embodiment of an optical sensor pursuant to the present invention.

As an alternative to the sensors of FIGS. 3–5, a circular configuration may be used, as shown in FIG. 6. This optical sensor 106 may comprise multiple monolithic or independent sensors as discussed above, where the sensors are concentrically configured in tracks, and further divided into pie-shaped sectors.

Scanner Controller

The scanner controller 108 comprises a digital processing apparatus such as a microprocessor. In one embodiment, where the system 100 is implemented in an IBM THINKPAD™ MODEL 755CV laptop computer, the scanner controller 108 may comprise an Intel brand 80486 model microprocessor running at 33/100 MHz. Alternatively, the scanner controller 108 may comprise an assembly of discrete circuit elements, an application specific integrated circuit ("ASIC"), or another suitable processing apparatus.

Figure 7:
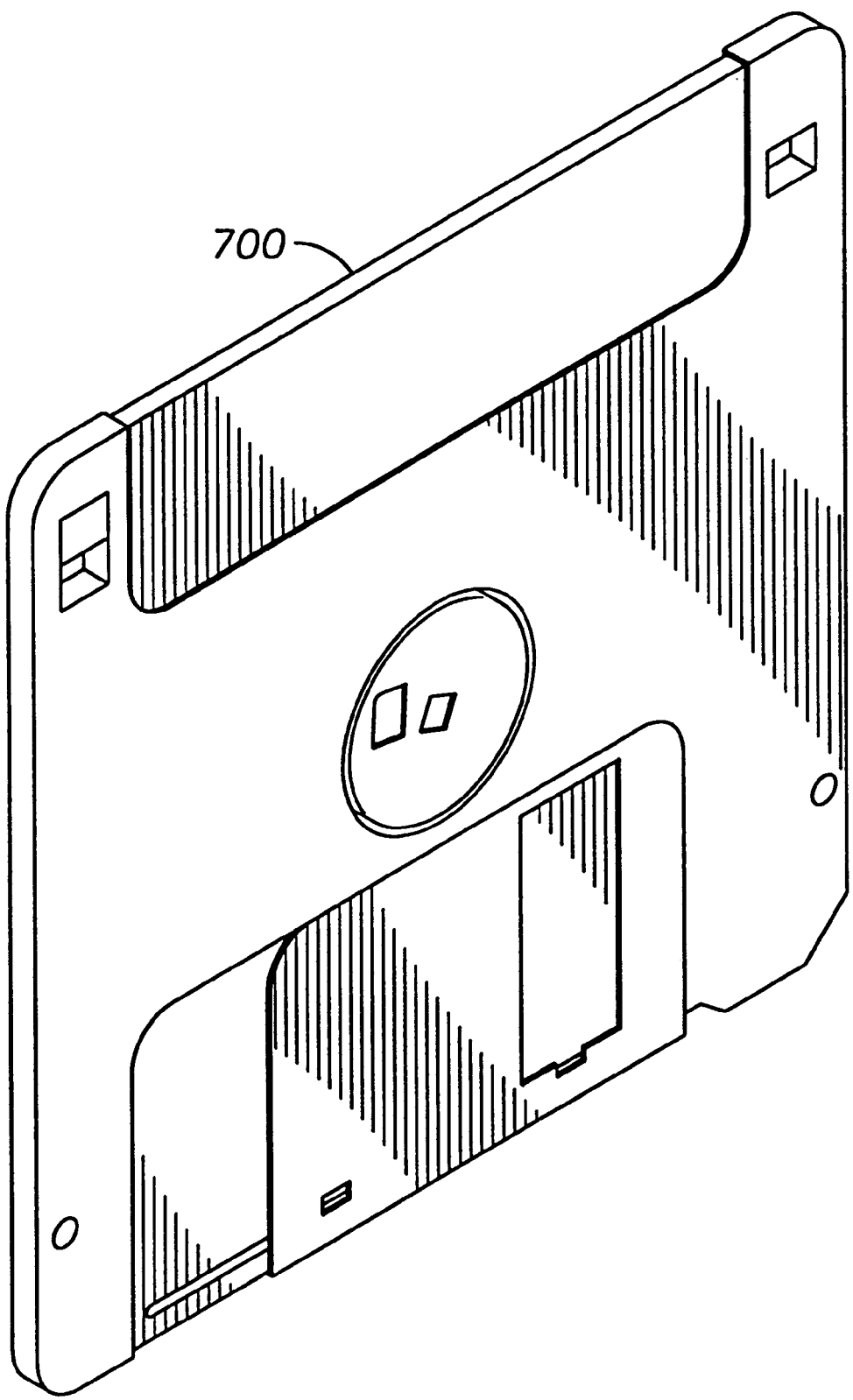
FIG. 7 is a diagram of an article of manufacture comprising a data storage medium in accordance with the present invention.

Preferably, the scanner controller 108 operates by executing a series of computer-executable instructions. These instructions may reside, for example, in a data storage medium, such as a storage unit 111. The storage unit 111 may comprise, for example, the RAM or ROM (not shown) of a laptop computer. Alternatively, the instructions may be contained on another data storage medium, such as a computer diskette 700 (FIG. 7). Or, the instructions may also be stored on a DASD array, magnetic tape, conventional "hard drive", electronic read-only memory, optical storage device, paper "punch" cards, or another suitable data storage device. In an illustrative embodiment of the invention, the computer-executable instructions may comprise lines of compiled "C" language code.

Light Collector

Figure 8:
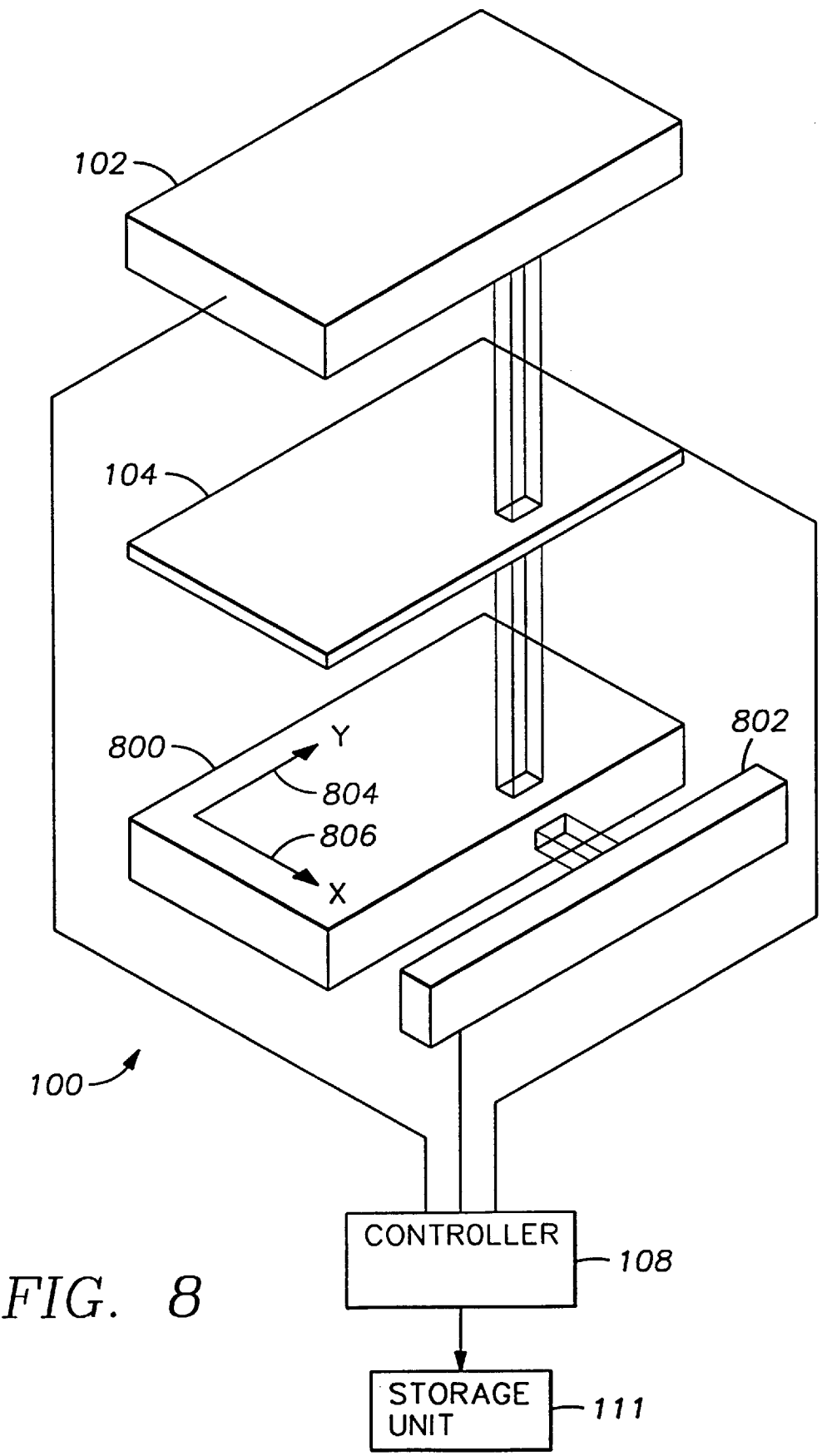
FIG. 8 is a diagram of the hardware components and interconnections of an optical scanning system employing a light collector pursuant to one embodiment of the invention.

As an optional feature, the image scanning apparatus 100 may additionally include a light collector, such as the light collector 800 (FIG. 8). In this embodiment, light passing through the optical shutter 104 is received by the collector 800 rather than the optical sensor 106. The collector 800 ultimately redirects the received light to a collected light sensor 802. The sensor 802 is coupled to the scanner controller 108.

The collector 800 preferably comprises an optical waveguide, such as fiber optic material, to receive and redirect light to the sensor 802. As illustrated, the collector 800 aggregates light from all similarly situated points on the Y-axis 804, and collimates these signals to similarly situated edge positions where they are ultimately received by the sensor 802. Hence, as illustrated, the output of the collector 800 does not distinguish between light signals that are all received at various locations along the X-axis 806 if their Y-axis 804 coordinates are the same. If desired, the sensor 802 may include a plurality of optical sensing elements, each corresponding to a different Y-axis 804 point of the collector 800.

Alternatively, the sensor 802 may include an additional waveguide (not shown), which aggregates all light signals received from the collector 800 to provide a single output signal. In this embodiment, the sensor 802 may utilize a single optical sensing element, such as a photodiode. This is possible since the Y-axis 804 signals have been aggregated by the collector 800 and the X-axis 806 signals have been aggregated by the waveguide (not shown) of the sensor 802. This single sensing element is coupled to the scanner controller 108.

A chief advantage of using the light collector 800 is a reduction in the size of the optical sensor 802. Namely, the sensor 802 (unlike the sensor 106 described in FIGS. 1–6) need not be as large as the optical shutter 104. As discussed above, the system of FIG. 8 may be implemented with a single, small optical sensing element such as a photodiode. Another advantage is that this feature enables sensing of the light signals remotely from the light source 102, optical shutter 104, controller 108 and other components of the apparatus 100, thereby helping to reduce the effect of electrical noise from these components on the sensed light signals.

Other collector configurations are also contemplated by the invention, as well. For instance, the collector 800 may comprise a plurality of fiber optic elements, where each element simply redirects (without aggregating) a light "pixel" to a separate or a common optical sensor located elsewhere. Or, the collector 800 may comprise a single contiguous waveguide, such as fluorescent plastic material, that concentrates light and directs it to one or more focal points, such as its periphery. Other arrangements will also be apparent to those of ordinary skill in the art having the benefit of this disclosure.

OPERATION

A different aspect of the present invention concerns a method for scanning images, illustrated by the tasks 900 of the flowchart appearing in FIG. 9. As an example, the sequence 900 is illustrated in the context of the hardware components of FIG. 1, which are assembled in the form of a laptop computer. In this embodiment, the tasks 900 may be directed by the laptop computer's microprocessor, which may also be used to implement the scanner controller 108 (FIG. 1) as discussed above.

To scan an image according to the invention, the sequence 900 is initiated in task 902. This may be accomplished, for example, by "pointing" and "clicking" on a corresponding icon or entering a DOS command.

Next, in task 904, the light source 102 directs light to the optical shutter 104. While receiving light from the source 102, the optical shutter 104 activates substantially all of its pixels, while leaving a predetermined sized contiguous grouping of the pixels un-activated. This causes the activated pixels to assume a first light transmissive quality with respect to the wavelength of light provided by the light source 102, where the un-activated pixels assume a second light transmissive quality.

In an illustrative embodiment, the first and second light transmissive qualities are opaqueness and transparency, respectively. Thus, the activated pixels become substantially opaque to the wavelength of light provided by the light source 102, and the un-activated pixels become substantially transparent to that wavelength of light. The opaqueness of the activated pixels may be enhanced by choosing a pixel color with optimum opaqueness for the particular wavelength generated by the light source.

The group of un-activated pixels forms a transparent region called a "scanning cursor." Although "activation"

may involve providing a predetermined electrical signal to the pixels, it may instead involve withholding any electrical signal from the pixels.

Preferably, the scanning cursor includes as few pixels as possible, to provide the most detailed scanning resolution possible. With a monolithic or a segmented monolithic optical sensor, for example, the scanning cursor is the smallest unit of scanning resolution. However, to practically implement the invention, a tradeoff may be needed between small scanning cursor size (with high resolution) and larger scanning cursor size (with faster scanning time).

In task 904, an image is also presented to the optical sensor 106. As discussed in greater detail below, this may occur in a number of different ways. For instance, if the light source 102 comprises an image projector, then the image is created by the source 102 directing light onto the optical sensor 106 via the optical shutter 104. In contrast, if the light source comprises a lamp or an ambient light source, the image is created by the light source 102 passing light through an object to be imaged and the optical sensor 104, not necessarily in that order. The area on the optical sensor 106 that receives the image is called the "image area".

In task 906, the scanning cursor is sequentially moved in a pattern that systematically traverses the entire the image area. As an example, this pattern may comprise a raster pattern in the case of a monolithic optical sensor. Or, in the case of a segmented monolithic optical sensor or a photosensor array, the pattern may involve multiple simultaneous raster patterns.

More particularly, to generate the scanning cursor, the optical shutter 104 in task 906 changes the activation status of the pixels, such that the scanning cursor travels across the image in a predetermined pattern at a predetermined speed. Concurrently, the optical sensor 106 measures light passing from the light source 102 through the scanning cursor of the optical shutter 104. More particularly, for each sequential position of the scanning cursor, the optical sensor 106 measures the shuttered light corresponding to that region of the image area. The optical sensor 106 therefore creates an electrical representation of detected light signals for each of many tiny regions of the image area.

The optical sensor 106 may operate in a variety of ways, according to (1) whether the apparatus 100 uses a monolithic, segmented monolithic, rectangular photosensor array, circular photosensor array, or another sensor arrangement, and (2) whether the apparatus 100 uses a collector 800 (FIG. 8).

If a monolithic sensor 106 is used (FIG. 2), the sensor does not provide any information about the location at which light is sensed. The monolithic sensor 106 only provides an output indicating the magnitude of light being sensed. Position information is unnecessary, since the precise location being scanned at any time is identified by the position of the scanning cursor.

Operation of a segmented monolithic sensor (FIGS. 3–4) is similar to a monolithic sensor. However, multiple scanning cursors can be used at one time. In particular, each scanning cursor only scans across the region of the optical shutter 104 that uniquely overlies a particular monolithic sensing region.

Rectangular or circular photosensor arrays (FIGS. 5–6) may be operated in a number of ways. In one example, the photosensors of the array may be selectively activated to de-activate all but the photosensors nearest the scanning cursor. Or, all photosensors may be operated continuously, relying upon the opaqueness of the un-activated pixels of the optical shutter 104 to prevent light signals from reaching any photosensors other than those beneath the scanning cursor.

In contrast, if a collector 800 is used, light passing through the optical shutter 104 is received by the collector 800 rather than the optical sensor 106. The collector 800 ultimately redirects the received light to the collected light sensor 802. If the output of the collector 800 distinguishes the X-axis 806 and Y-axis 804 positions of received light signals (as in the case of a fiber optic array that simply redirects without aggregating light signals), the sensor 106 may operate like a rectangular or circular photosensor array, as described above. If the output of the collector 800 partially distinguishes the X-axis 806 and Y-axis 804 positions of received light signals (as shown in FIG. 8), the sensor 106 may function like a segmented monolithic sensor, as described above. If the output of the collector 800 simply provides a single aggregated signal that does not provide any position information for received light signals, the sensor 106 may simply comprise a single element, such as a photo diode, that functions like a monolithic sensor, as described above.

After scanning the image in task 906, the sensor 106 forwards the resultant measurements in task 908 to the scanner controller 108 for subsequent processing (not shown) by the controller 108. This processing may be performed, for example, according to known routines.

Applications

The method illustrated in FIG. 9 may be implemented, adapted, and/or supplemented in a number of different ways to suit the needs of particular applications, as described by the following examples.

A. Scanning Documents

Figure 10:
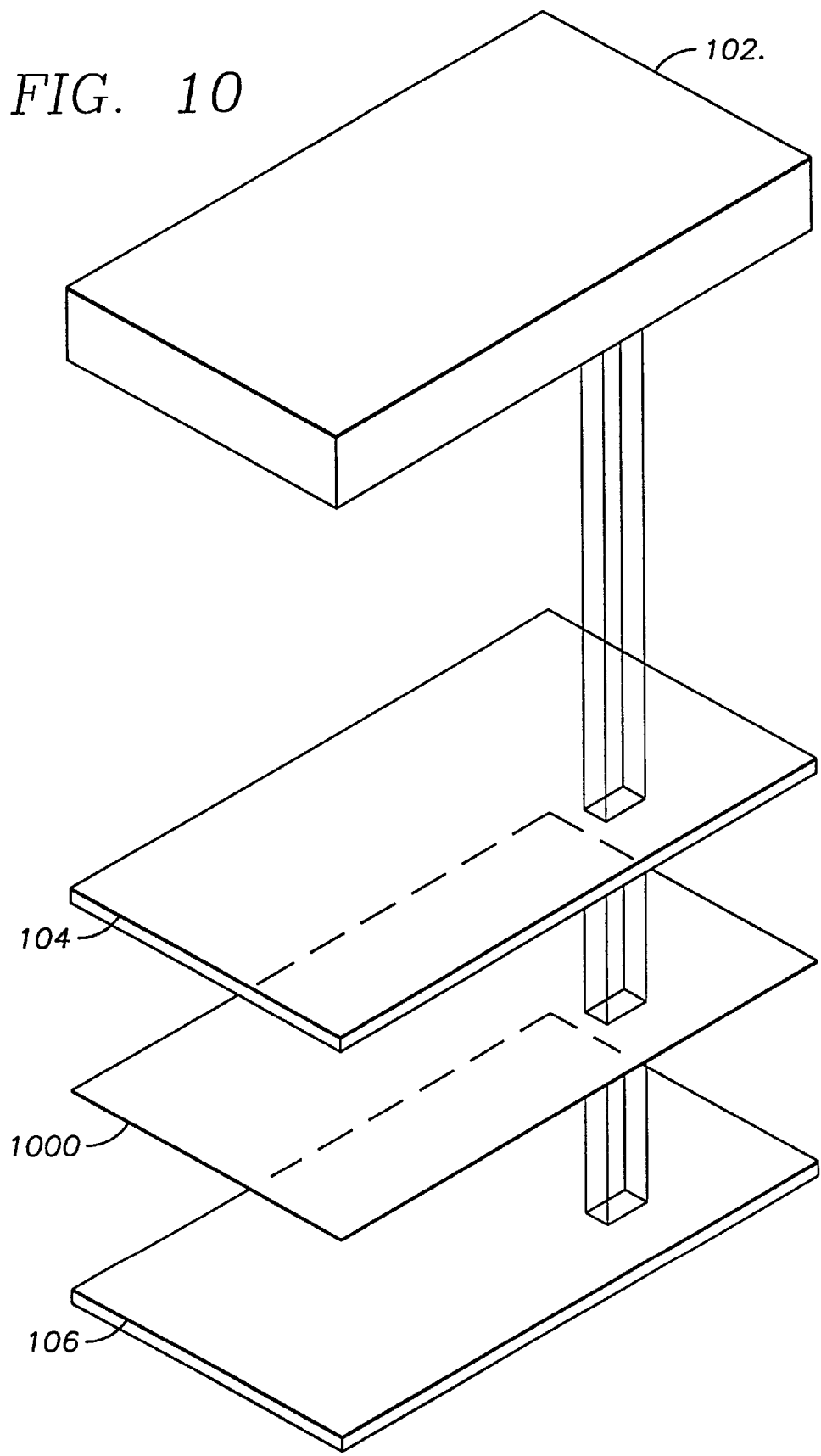
FIG. 10 is a diagram illustrating a first document position for scanning pursuant to the invention.
Figure 11:
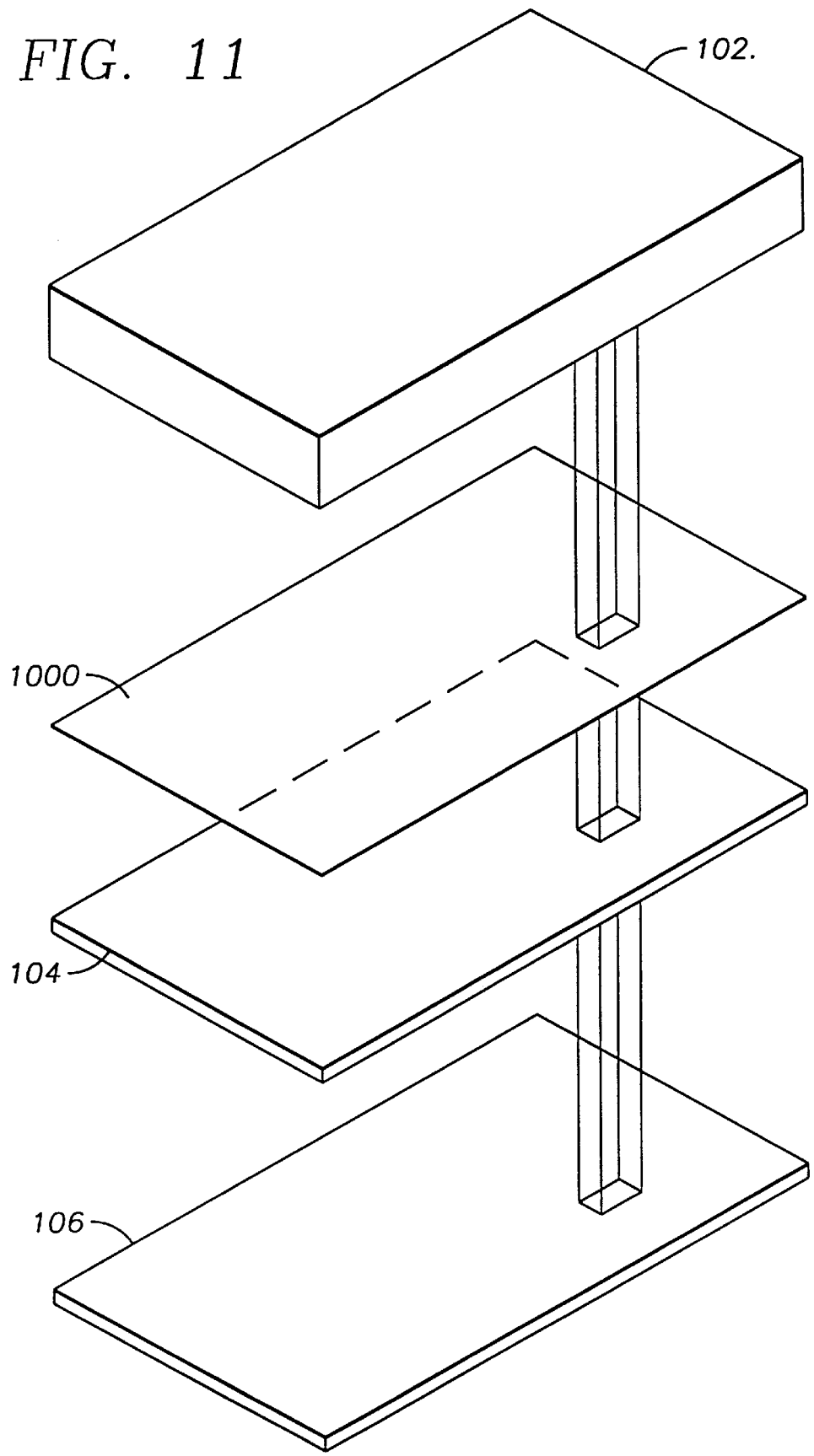
FIG. 11 is a diagram illustrating a second document position for scanning pursuant to the invention.

One application of the routine 900 is to scan documents. Here, as shown in FIG. 10, a document 1000 is introduced between the optical shutter 104 and optical sensor 106. Alternatively, as shown in FIG. 11, the document 1000 may be introduced instead between the light source 102 and the optical shutter 104.

In scanning documents, the light source 102 generates light that passes through the document 1000 and optical shutter 104 prior to detection by the optical sensor 106. Here, the activated pixels of the optical shutter 104 are preferably black or another color suitably opaque to the light from the source 102. The un-activated pixels are preferably transparent. The source 102 is preferably selected such that its light is substantially blocked by non-transmissive materials on the document 1000, such as ink If the backlight of the laptop computer is used as the light source 102, the optical sensor 106 is placed against the computer's LCD screen. Alternatively, the backlight may be disconnected from the LCD screen, and replaced by the optical sensor 106, where the light source 102 is provided by ambient room lighting, outdoor light, an incandescent lamp, a fluorescent lamp, etc.

Although reference is made to "documents", and flat objects are more conducive to accurate scanning, a flat object is not required as long as the object is penetrable by light from the source 102. Therefore, the invention is not limited to scanning "documents." In the case of documents, however, this term is understood to include materials such as paper, transparencies (also called "viewgraphs" or "foils"), and a variety of other transparent or semi-transparent materials employing ink or other means to provide a suitable contrast in light transparency.

B. Scanning Projected Images

Figure 12:
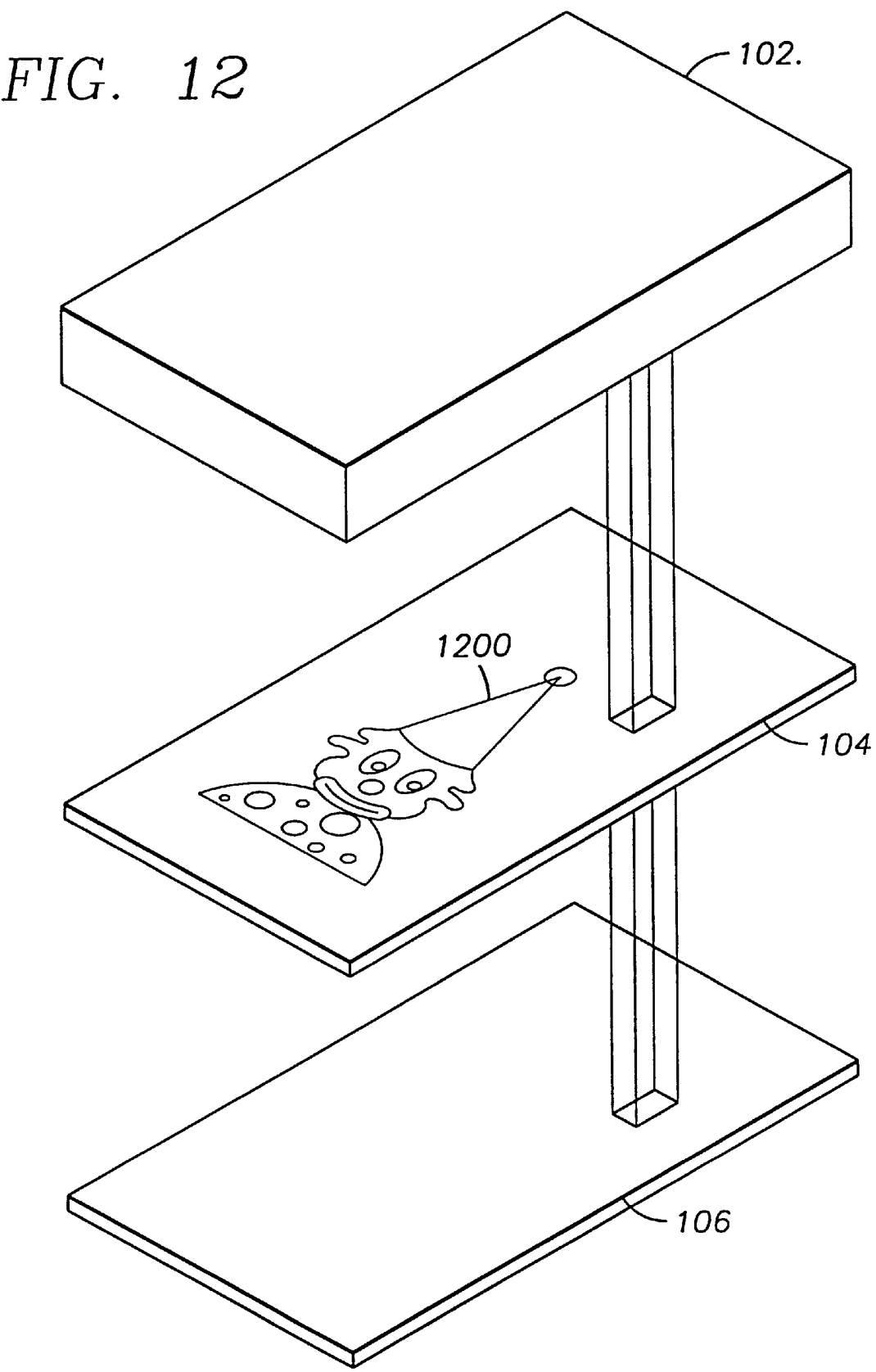
FIG. 12 is a diagram illustrating image scanning using an image projector pursuant to the invention.

Another application of the routine 900 is to scan projected images, without the need for a physical scanning object such as a document. Here, as shown in FIG. 12, the light source 102 may comprise an image projector that generates and projects an image 1200 onto the optical shutter 104. Alternatively, the light source may comprise a light emitting structure, placed in proximity to the optical shutter 104. If the object to image is a light emitting structure itself, this obviates the need for a separate light projector 102. As an example, the object to image may be an LED display. In this embodiment, no physical object such as a document is scanned, as in the case where the light source 102 composes an image projector. In contrast, the light source (i.e., light emitting structure) does not "project" an image onto the shutter 104.

C. Scanning Interference Patterns

Another application of the routine 900 is to scan an interference pattern or another type of light intensity modulation. One example is a holographic interference pattern which may be created by interfering a reference beam with an object beam, as known in the art of optics.

D. Scanning Coded Documents

Another application of the routine 900 is to scan documents imprinted with invisible markings. For example, a paper document may be imprinted with ink or another marking that is invisible to the human eye. Here, the source 102 is preferably selected such that its light is substantially blocked by the otherwise "invisible" markings on the document 1000. In this embodiment, the activated pixels of the optical shutter 104 preferably display a color suitably opaque to the light from the source 102. The un-activated pixels are transparent to light from the source 102.

Therefore, without the need to expose the document to developing chemicals and the like, the document may be scanned by applying the principles described above. One advantage of this approach, unlike other applications using developing chemicals to reveal "invisible ink", is that the document continues to be unreadable by third parties, even after the document has been read by its intended recipient.

E. Currency Verification

Another application of the routine 900 is to verify the legitimacy of currency, i.e. to detect counterfeit paper money. This may be achieved by scanning a paper bill that has been minted with certain coded images in "invisible ink" as an anti-counterfeit security feature. In this embodiment, the bill is first scanned as discussed above (see, "Scanning Coded Documents"). Then, the scanner controller 108 compares the scanned image to a pre-defined list of coded images recognized as being valid. Bills that do not contain the required coded images are deemed to be counterfeit.

This system is useful for detecting counterfeit money in commercial applications such as in banks and retail establishments. In addition, this system is practical for personal use, since the scanning apparatus 100 may be compactly implemented using a laptop computer, as discussed above.

F. Color Scanning

Another application of the routine 900 is to separately provide scanned representations of each color in a scanned image.

1. Image Projector

In one embodiment (FIG. 13), this is achieved by using a light source 102 that comprises an image projector that creates and projects an image for scanning, as discussed above. Accordingly, no physical document is scanned, since the source 102 itself creates the image upon the optical shutter 106.

FIG. 13 illustrates an example of this process in the form of the tasks 1300. In this example, the sequence 1300 is illustrated in the context of the hardware components of FIG. 1, which are assembled in the form of a laptop computer. In this embodiment, the optical shutter 104 comprises a multi-color device, such as a color LCD screen. In this embodiment, the tasks 1300 may be directed by the laptop computer's microprocessor, which may also be used to implement the scanner controller 108 (FIG. 1) as discussed above.

To scan an image according to this embodiment of the invention, the sequence 1300 is initiated in task 1302. This may be accomplished, for example, by "pointing" and "clicking" on a corresponding icon or entering a DOS command.

Next, in task 1304, the first color to scan ("scanning color") is selected. For example, in the case of an RGB image, "red" may arbitrarily designated as the first scanning color. Then, in task 1306 the light source 102 projects its image onto the optical shutter 104. While the light source 102 continues to project the image in task 1306, the optical shutter 104 activates pixels needed to "block" all colors of the image except for the scanning color. In the RGB example, where red is the first scanning color, the optical shutter 104 activates all green and blue pixels to prevent the non-red colors from passing to the sensor 106. In addition, the optical shutter 104 creates a scanning cursor by activating substantially all red pixels of the optical shutter 104 while leaving a predetermined sized contiguous grouping of the red pixels un-activated. Thus, the scanning cursor is transparent to red light from the source 102. As mentioned above, "activation" may involve providing a predetermined signal to the pixels, or withholding a signal from the pixels instead.

Also in task 1306, the scanning cursor is traversed across the image area while the optical sensor 106 simultaneously measures the light passing from the light source 102 through the scanning cursor of the optical shutter 104. The optical sensor 106 thus creates electrical output signals representing the detected light signals. Accordingly, this representation corresponds to the appearance of the scanning color in the image, e.g. the red portions of the image in the present example.

Next, in task 1308, the sensor 106 forwards these measurements to the scanner controller 108 for subsequent processing (not shown) by the controller 108. After task 1308, query 1310 asks whether there are any other colors left to scan. If so, the image is sequentially scanned using the remaining colors in tasks 1312 and 1306. When no more scanning colors remain, the program ends in task 1314. Then, the image may be processed by applying an appropriate scanning routine, such as one of many such known routines.

2. Document Scanner

In another embodiment of color image scanning, the light source 102 comprises a lamp, laptop computer backlighting source, ambient room light, outdoor light, or another source as discussed above. The light source 102 may be a source that concurrently provides multiple wavelengths of light, or a source that selectively provides one or more different wavelengths of light in response to an input. In this embodiment, a physical scanning object is used, such as a paper document.

The process of this embodiment is described as follows, with reference to the routine 1300 of FIG. 13. This example, like the preceding example, is illustrated in the context of the hardware components of FIG. 1, which are assembled in the form of a laptop computer. In the laptop computer embodiment, the optical shutter 104 comprises a multi-color device, such as a color LCD screen. In this embodiment, the tasks 1300 may be directed by the laptop computer's microprocessor, which may also be used to implement the scanner controller 108 (FIG. 1) as discussed above.

To scan an image according to this embodiment of the invention, the sequence 1300 is initiated in task 1302. This may be accomplished, for example, by "pointing" and "clicking" on a corresponding icon or entering a DOS command.

Figure 14:
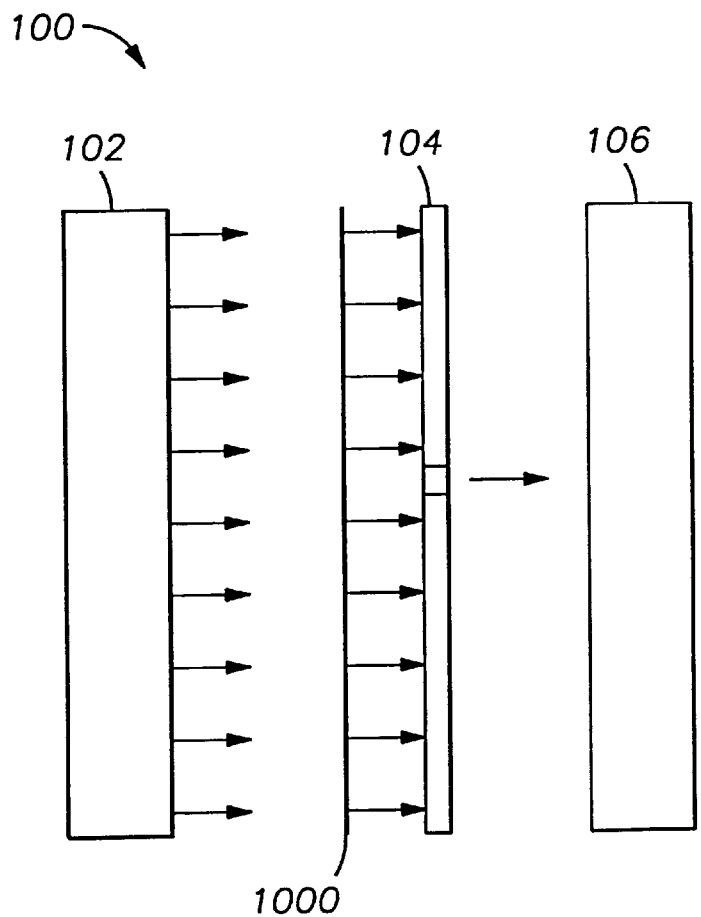
FIG. 14 is a side view diagram illustrating the first document position for scanning pursuant to the invention.

Next, in task 1304, the first color to scan ("scanning color") is selected. Also in task 1304, although not shown, the document is loaded into the scanning apparatus 100. This may involve positioning the document as shown in FIGS. 10 or 11. FIG. 14 illustrates the positioning of FIG. 11 in greater detail, where the document 1000 is placed between the light source 102 and the optical shutter 104.

In task 1306, while the light source 102 continues to direct light through the document and the optical shutter 104 in task 1306, the optical shutter 104 activates pixels needed to "block" all colors of the image except for the scanning color. In addition, the optical shutter 104 creates a scanning cursor by activating substantially all pixels of the scanning color while leaving a predetermined sized contiguous grouping of these pixels un-activated. Thus, the scanning cursor is transparent to light of the scanning color. As mentioned above, "activation" may involve providing a predetermined signal to the pixels, or withholding a signal from the pixels instead.

Also in task 1306, the scanning cursor is traversed across the image area while the optical sensor 106 simultaneously measures the light passing from the light source 102 through the scanning cursor of the optical shutter 104. The optical sensor 106 thus creates electrical output signals representative of the detected light signals. Accordingly, this representation corresponds to the appearance of the scanning color in the image.

Next, in task 1308, the sensor 106 forwards these measurements to the scanner controller 108 for subsequent processing (not shown) by the controller 108. After task 1308, query 1310 asks whether there are any other colors left to scan. If so, the image is sequentially scanned using the remaining colors in tasks 1312 and 1306. When no more scanning colors remain, the document is removed from the apparatus 100 and the program ends in task 1314. Then, the image may be processed by applying an appropriate scanning routine, such as one of many such known routines.

Accelerated Scanning Techniques

A. Adaptive Scanning

In an enhanced implementation of the invention, certain scanning techniques may be applied to accelerate the scanning process pursuant to the invention. Generally, these adaptive techniques work by varying the scanning cursor's size during the scan. For instance, a large scanning cursor may be used to scan blank, background, monochrome, or otherwise non-distinct areas of an image. This helps increase scanning speed, since the larger scanning cursor traverses the image more quickly.

Upon detecting an area of a predetermined level of detail, however, the scanning cursor may be adjusted to a smaller size to finish scanning the detailed area. With monolithic-type sensors, using a smaller scanning cursor helps boost the level of scanning sensitivity and resolution.

B. Multi-Channel Scanning

Multi-channel scanning involves creating multiple scanning cursors simultaneously, and scanning separate portions of the image area simultaneously with each scanning cursor. This may be performed, for example, with segmented monolithic optical sensors or photosensor arrays, which are capable of sensing light simultaneously received at distinct locations. Using sixteen scanning cursors simultaneously, for example, reduces the image scanning time by a factor of sixteen.

Average-And-Substitute Enhancement

As mentioned above, the scanning cursor is the smallest possible unit of scanning resolution with a monolithic or segmented monolithic optical sensor. And, the entire image area is scanned by sequentially moving the scanning cursor in a pattern to systematically traverse the entire the image area. For each sequential position of the scanning cursor, the optical sensor 106 measures the shuttered light corresponding to that region of the image area. For each of many tiny regions of the image areas, then, the optical sensor 106 thus creates an electrical output signal representative of the light signal detected at that region.

These electrical output signals may be stored, assembled, or otherwise processed to develop an electrical representation of the entire image. In one embodiment, each electrical output signal is compared to a threshold value to determine whether the corresponding region of the image is filled (e.g. "black") or empty (e.g. "white"). Output signals not meeting the threshold are deemed to represent empty regions of the image, whereas output signals meeting or exceeding the threshold are deemed to represent filled regions of the image.

Figure 15:
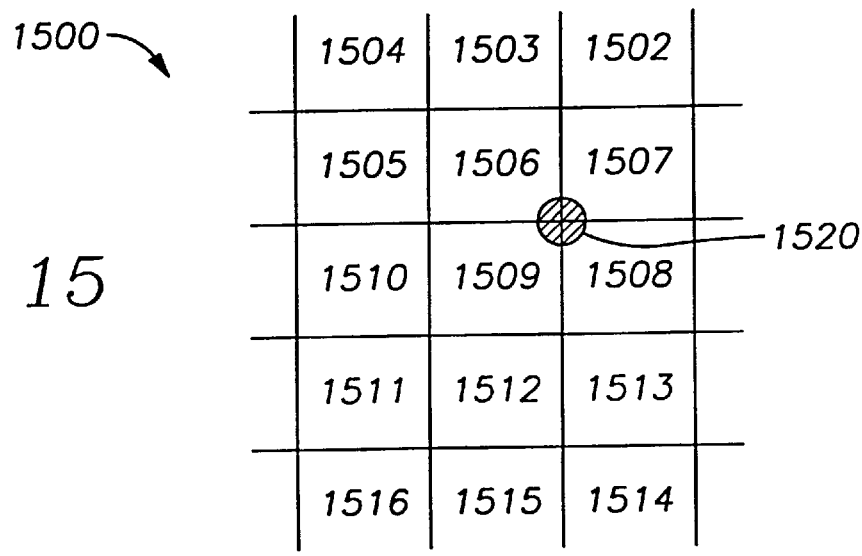
FIG. 15 is a pixel diagram to illustrate an example of average-and-substitute enhancement techniques scanning pursuant to the invention.

FIG. 15 illustrates one potential problem that can arise with the "threshold" processing method. Generally, this problem can occur with small image features that lie on the edge of two different regions separately traversed by the scanning cursor. As shown in FIG. 15, a portion 1500 of an image area contains a number of regions 1502–1516 of minimum resolution, each corresponding to the size of the scanning cursor. The image area contains a feature 1520 that overlaps multiple regions 1506–1509. Although significant in size when compared to any of the regions 1502–1514, the feature 1520 may be to small to result in any output signal that exceeds the threshold of any of the regions 1506–1509. More particularly, when the optical sensor 106 individually generates electrical output signals for each region 1506–1509, each such output signal may fall short of the threshold for that region, although all output signals together would exceed the threshold. In other words, the feature 1520 is not detected, even though it would be detected if it were placed squarely in one of the regions 1402–1514.

To solve this problem, an average-and-substitute enhancement technique pursuant to the invention may be used. To implement this technique, a modified output signal is developed for each pixel. The modified output signal for a region takes into account a region's output signal as well as the output signals of a predetermined group of adjacent regions. For example, the predetermined group may comprise all adjacent regions. In this case, for instance, the modified output signal of the region 1509 is computed by summing the output signals of all adjacent regions (1505–1508 and 1510–1513) and dividing by nine (the total number of regions).

Other ways of specifying the designated "adjacent" regions may be used as well, such as choosing (1) a square of regions including the top, right, and top-right regions, or (2) the bottom, right, and bottom-right regions, or (3) the top and top-right regions, or (4) another suitable arrangement.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. An image scanning apparatus for scanning an image of an object that is placed against a face of an optical shutter, comprising:

an optical shutter comprising an LCD screen having first and second faces and a plurality of individually activateable pixels therebetween comprising three arrays of individually activateable LCD pixels, said optical shutter presenting image data by activating pixels of the plurality of pixels, each pixel having a first transparency when activated and a second transparency when not activated, the first and second transparencies being first and second colors respectively, the pixels of each of the three arrays having a different transparency than pixels of other arrays when un-activated, the pixels of each of the three arrays when de-activated being respectively red, green, and blue;

a light source positioned to direct light through the object that is placed against a face of the optical shutter, and through non-activated pixels of said plurality of pixels, the light source being configured to project a pattern of light that evenly covers the first face of the optical shutter when not obstructed by any portion of the object;

an optical sensor positioned adjacent the second face for sensing light passing through the object and through corresponding non-activated pixels of the plurality of pixels;

a scanner controller comprising a microprocessor coupled to the optical shutter, the scanner controller being configured to activate substantially all of said pixels while leaving a contiguous grouping of one or more of said pixels un-activated of the red, green, and blue arrays, in sequence, and to change activation status of said plurality of pixels such that the grouping of un-activated pixels scans across the optical shutter in a predetermined two-dimensional pattern systematically traversing an entire image area substantially corresponding with the second face of the optical shutter by moving the grouping of un-activated pixels at a predetermined speed, and wherein the scanner controller is coupled to the light source to exert control over the light source, and wherein the scanner controller is also coupled to the optical sensor; and a storage unit communicatively coupled to the scanner controller, the storage unit containing computer-executable instructions executable by the scanner controller.

2. The image scanning apparatus of claim 1, wherein the optical shutter, light source, optical sensor, scanner controller, and storage unit are components of a laptop computer.

3. The image scanning apparatus of claim 2 wherein:
the object is placed against the first face of the optical shutter;
the light source concurrently provides multiple wavelengths of light in a range visible to humans;
the light source comprises a backlight of the laptop computer; and
the optical sensor is positioned against the LCD screen.

4. The image scanning apparatus of claim 3 wherein the optical sensor is a monolithic sensor having a single sensing area, the single sensing area having substantially the same shape and size as the second face of the optical shutter, the single sensing area being configured to produce an output signal proportional to the sum of all light striking the entire single sensing area after exiting the second face, and wherein the grouping of un-activated pixels scans across the optical shutter in a raster pattern.

5. The image scanning apparatus of claim 4, said grouping of un-activated pixels being a single pixel.

6. The image scanning apparatus of claim 5, wherein the storage unit is a RAM, and wherein the single sensing area of the monolithic sensor comprises a pyroelectric sheet, and further comprising an expansion card for coupling the scanner controller to the optical sensor.

7. The image scanning apparatus of claim 5, wherein the storage unit is a ROM, and wherein the single sensing area of the monolithic sensor comprises a solar cell, and further comprising a PCMCIA card for coupling the scanner controller to the optical sensor.

8. The image scanning apparatus of claim 3 wherein the optical sensor is a monolithic sensor comprising a plurality of monolithic strips, with each monolithic strip comprising a solar cell, and wherein the scanner controller is configured to operate all of the monolithic strips continuously.

9. The image scanning apparatus of claim 3 wherein the optical sensor is a monolithic sensor comprising a plurality of monolithic strips, with each monolithic strip comprising a pyroelectric sheet, and wherein the scanner controller is configured to activate the monolithic strip nearest the scanning cursor and to deactivate all of the other monolithic strips.

10. The image scanning apparatus of claim 3 wherein the optical sensor is a monolithic sensor comprising a plurality of monolithic strips, with each monolithic strip comprising a thin-film sensing element, and wherein the scanner controller is configured to operate all of the monolithic strips continuously.

11. The image scanning apparatus of claim 3 wherein the optical sensor is a monolithic sensor comprising a monolithic mosaic comprising a plurality of solar cells, and wherein the scanner controller is configured to activate the solar cell nearest the scanning cursor and to deactivate all of the other solar cells.

12. The image scanning apparatus of claim 3 wherein the optical sensor is a monolithic sensor comprising a monolithic mosaic comprising a plurality of pyroelectric sheets, wherein the scanner controller is configured to operate all of the pyroelectric sheets continuously.

13. The image scanning apparatus of claim 3 wherein the optical sensor is a monolithic sensor comprising a monolithic mosaic comprising a plurality of thin-film sensing elements, and wherein the scanner controller is configured to activate the thin-film sensing element nearest the scanning cursor and to deactivate all of the other thin-film sensing elements.

14. The image scanning apparatus of claim 3 wherein the optical sensor is a monolithic sensor comprising a plurality of concentrically configured tracks that are divided into pie-shaped sectors, with each sector comprising a solar cell, and wherein the scanner controller is configured to activate the solar cell nearest the scanning cursor and to deactivate all of the other solar cells.

15. The image scanning apparatus of claim 3 wherein the optical sensor is a monolithic sensor comprising a plurality of concentrically configured tracks that are divided into pie-shaped sectors, with each sector comprising a pyroelectric sheet, and wherein the scanner controller is configured to activate the pyroelectric sheet nearest the scanning cursor and to deactivate all of the other pyroelectric sheets.

16. The image scanning apparatus of claim 3 wherein the optical sensor is a monolithic sensor comprising a plurality of concentrically configured tracks that are divided into pie-shaped sectors, with each sector comprising a thin-film sensing element, wherein the scanner controller is configured to operate all of the thin-film sensing elements continuously.

17. The image scanning apparatus of claim 3 wherein the optical sensor comprises a rectangular photosensor array comprising a plurality of photodiodes wherein each photodiode corresponds with one shuttering element of the optical shutter, and wherein each photodiode receives light transmitted from the light source in substantially a straight line.

18. The image scanning apparatus of claim 3 wherein the optical sensor comprises a rectangular photosensor array comprising a plurality of phototransistors wherein each phototransistor corresponds with multiple shuttering elements of the optical shutter.

19. The image scanning apparatus of claim 3 wherein the optical sensor comprises a rectangular photosensor array comprising a plurality of CCD elements wherein each CCD element corresponds with a sub-portion of one shuttering element of the optical shutter.

20. The image scanning apparatus of claim 2, further comprising a light diffuser optically coupled to the light source;
and wherein the light source is a fluorescent lamp, and wherein the object is placed against the second face of the optical shutter, and the grouping of un-activated pixels comprises multiple pixels cooperatively forming a rectangle.

21. The image scanning apparatus of claim 20, wherein the optical sensor is a monolithic sensor having a single sensing area, the single sensing area having substantially the same shape and size as the second face of the optical shutter, the single sensing area being configured to produce an output signal proportional to the sum of all light striking the entire single sensing area, the single sensing area of the monolithic sensor comprising a thin film sensing element, and wherein the grouping of un-activated pixels scans across the optical shutter in a raster pattern, and wherein the light source selectively provides one or more different wavelengths of light in a range visible to humans in response to an input, and further comprising a ribbon cable for coupling the scanner controller to the optical sensor.

22. The image scanning apparatus of claim 2:
further comprising a light collector having a light collecting area, the light collecting area having substantially the same shape and size as the second face of the optical shutter, the light collector being positioned adjacent the second face to collect light from the light source passing through the object and also passing through corresponding non-activated pixels of said plurality of pixels, the light collector comprising at least one waveguide for guiding light collected by the light collector; and
wherein the optical sensor has at least one light sensing element, each light sensing element being optically coupled for sensing light transmitted through at least one waveguide, and wherein the object is placed against the first face of the optical shutter, and wherein the light source concurrently provides multiple wavelengths of light in a range visible to humans.

23. The image scanning apparatus of claim 22 wherein the optical sensor is a photodiode.

24. The image scanning apparatus of claim 23, wherein said grouping of unactivated pixels is a single pixel, and wherein the storage unit is a ROM, and further comprising a PCMCIA card for coupling the scanner controller to the optical sensor.

25. The image scanning apparatus of claim 22 wherein the light collector comprises a plurality of fiber optic elements.

26. An image scanning apparatus for scanning a projected image, comprising:
an optical shutter comprising an LCD screen having first and second faces and a plurality of individually activateable pixels therebetween comprising three arrays of individually activateable LCD pixels, said optical shutter presenting image data by activating pixels of the plurality of pixels, each pixel having a first transparency when activated and a second transparency when not activated, the first and second transparencies being first and second colors respectively, the pixels of each of the three arrays having a different transparency than pixels of other arrays when un-activated, the pixels of each of the three arrays when de-activated being respectively red, green, and blue;
a light source positioned to direct light through non-activated pixels of said plurality of pixels;
an optical sensor for sensing light passing through non-activated pixels of the plurality of pixels;
a scanner controller comprising a microprocessor coupled to the optical shutter, the scanner controller being configured to activate substantially all of said pixels while leaving a contiguous grouping of one or more of said pixels un-activated of the red, green, and blue arrays, in sequence, and to change activation status of said plurality of pixels such that the grouping of un-activated pixels scans across the optical shutter in a predetermined two-dimensional pattern systematically traversing an entire image area substantially corresponding with the second face of the optical shutter by moving the grouping of un-activated pixels at a predetermined speed, and wherein the scanner controller is coupled to the light source to exert control over the light source, and wherein the scanner controller is also coupled to the optical sensor;
a storage unit communicatively coupled to the scanner controller, the storage unit containing computer-executable instructions executable by the scanner controller; and
wherein the optical shutter, optical sensor, scanner controller, and storage unit are components of a laptop computer, and wherein the optical sensor is positioned against the LCD screen.

27. The image scanning apparatus of claim 26 wherein the light source comprises an image projector that generates and projects an image onto the optical shutter.

28. The image scanning apparatus of claim 27 wherein the optical sensor is a monolithic sensor comprising a plurality of concentrically configured tracks that are divided into pie-shaped sectors, with each sector comprising a solar cell, and wherein the scanner controller is configured to operate all of the solar cells continuously.

29. The image scanning apparatus of claim 27 wherein the optical sensor is a monolithic sensor comprising a plurality of concentrically configured tracks that are divided into pie-shaped sectors, with each sector comprising a pyroelectric sheet, and wherein the scanner controller is configured to activate the pyroelectric sheet nearest the scanning cursor and to deactivate all of the other pyroelectric sheets.

30. The image scanning apparatus of claim 27 wherein the optical sensor is a monolithic sensor comprising a plurality of concentrically configured tracks that are divided into pie-shaped sectors, with each sector comprising a thin-film sensing element, and wherein the scanner controller is configured to activate the thin-film sensing element nearest the scanning cursor and to deactivate all of the other thin-film sensing elements.

31. The image scanning apparatus of claim 30, wherein said grouping of unactivated pixels is a single pixel, and wherein the storage unit is a ROM, and further comprising a PCMCIA card for coupling the scanner controller to the optical sensor.

32. The image scanning apparatus of claim 26 wherein the light source comprises an LED display located proximate the optical shutter.

33. A method for optically scanning an image of an object with an image scanning apparatus that includes an optical shutter comprising an LCD screen, the optical shutter having first and second faces and a plurality of individually activateable pixels therebetween comprising three arrays of individually activateable LCD pixels, the object being placed against a face of the optical shutter, each pixel having a first transparency when activated and a second transparency when not activated, the first and second transparencies being first and second colors respectively, the pixels of each of pixel array when un-activated having a different transparency than pixels of the other arrays when un-activated, the pixels of each of the three arrays when un-activated being respectively red, green, and blue, wherein said optical shutter presents image data by activating pixels of the plurality of pixels, said image scanning apparatus also including a light source positioned to direct light through the object and through non-activated pixels of the plurality of pixels, the light source being configured to project a pattern of light that evenly covers the first face of the LCD screen when not obstructed by any portion of the object, said image scanning apparatus also including an optical sensor for sensing light passing through the object and through corresponding non-activated pixels of the plurality of pixels, said image scanning apparatus also including a scanner controller comprising a microprocessor coupled to the optical shutter, the scanner controller also being coupled to the light source and to the optical sensor, the image scanning apparatus also including a storage unit communicatively coupled to the scanner controller, said method comprising:

storing computer-executable instructions executable by the scanner controller in the storage unit;

placing the object against the first face of the optical shutter between the light source and the first face of the optical shutter;

operating the light source to direct light through the object and then onto the first face and through non-activated pixels of the plurality of pixels and through the second face, the light directed by the light source concurrently providing multiple wavelengths of light in a range visible to humans, the light source projecting a pattern of light that evenly covers the shutter when there is no object present, the light source being controlled by the scanner controller;

activating sequentially for the red green, and blue arrays, substantially all of said pixels while leaving a contiguous grouping of one or more of said pixels of the color of the array being scanned un-activated and changing activation status of said plurality of pixels such that the grouping of un-activated pixels scans across the optical shutter in a predetermined two dimensional pattern systematically traversing an entire image area substantially corresponding with the second face of the optical shutter by moving the grouping of un-activated pixels at a predetermined speed;

concurrently with the activating step, operating the optical sensor to measure light from the light source passing through an area of the object and also passing through corresponding non-activated pixels of said plurality of pixels and exiting through the second face;

forwarding measurements of the measured light to the scanner controller for subsequent processing after scanning the image; and applying a scanning routine to process the image.

34. The method of claim 33, further comprising placing the optical sensor against the LCD screen, and wherein operating the optical sensor comprises producing an output signal proportional to the sum of all light striking the entire single sensing area of a monolithic sensor having a single sensing area, the single sensing area having substantially the same shape and size as the second face of the optical shutter, and wherein the grouping of un-activated pixels is scanned across the optical shutter in a raster pattern, and wherein the optical shutter, light source, optical sensor, scanner controller, and storage unit are components of a laptop computer, with the light source being the backlight of the laptop computer.

35. The method of claim 34 wherein the grouping of pixels that is left unactivated comprises a single pixel, and wherein the storage unit is a RAM, and wherein the single sensing area of the monolithic sensor comprises a solar cell, and further comprising the step of coupling the scanner controller to the optical sensor with a PCMCIA card.

36. The method of claim 33, wherein operating the optical sensor comprises:

collecting light passing through the object and the unactivated pixels with a light collector having a light collecting area having substantially the same shape and size as the second face of the optical shutter, with the light collector being positioned adjacent the second face, the light collector comprising at least one waveguide for guiding light collected by the light collector; and sensing light transmitted through at least one waveguide with at least one light sensing element, the optical sensor having at least one light sensing element.

37. The method of claim 36 wherein the grouping of pixels that is left unactivated comprises a single pixel, and wherein the storage unit is a RAM, and wherein the optical sensor has a single photodiode, and further comprising the step of coupling the scanner controller to the optical sensor with a ribbon cable.

38. The method of claim 33: wherein:

the grouping of un-activated pixels is multiple pixels cooperatively forming a rectangle;

the optical shutter, light source, optical sensor, scanner controller, and storage unit are components of a laptop computer, with the light source being the backlight of the laptop computer;

the storage unit is a RAM;

the optical sensor is a monolithic sensor comprising a plurality of concentrically configured tracks that are divided into pie-shaped sectors, with each sector comprising a pyroelectric sheet;

and further comprising:

placing the optical sensor against the LCD screen;
   coupling the scanner controller to the optical sensor with a PCMCIA card; and
   sequentially activating, with the scanner controller, the pyroelectric sheet nearest the scanning cursor and deactivating all of the other pyroelectric sheets.

39. The method of claim 38, said step of operating the optical sensor further comprising the steps of:

for each region of the optical shutter having a size corresponding to the non-activated pixels, operating the optical sensor to measure light from the source passing through the region and the second face and the object and generating an output signal representative of the measured light;

summing each output signal with output signals from a predetermined group of other regions to generate a summed signal, the predetermined group of other regions consisting of a predefined number of other regions; and dividing the summed signal by the predefined number plus one.

40. The method of claim 39 wherein the predefined number of other regions are located immediately above, to the right, and to the top-right of the region, and where the summed signal is divided by four.

41. The method of claim 33: wherein:

the grouping of un-activated pixels is multiple pixels cooperatively forming a rectangle;

the optical shutter, light source, optical sensor, scanner controller, and storage unit are components of a laptop computer;

the storage unit is a RAM;

the optical sensor is a monolithic sensor comprising a plurality of concentrically configured tracks that are divided into pie-shaped sectors, with each sector comprising a thin-film sensing element;

and further comprising:
disconnecting a backlight from the LCD screen;
replacing the backlight with the optical sensor;
coupling the scanner controller to the optical sensor with a PCMCIA card; and
sequentially activating, with the scanner controller, the thin-film sensing element nearest the scanning cursor and deactivating all of the other thin-film sensing elements.

42. The method of claim 33, the operating step comprising projecting an image upon the optical shutter.

43. An article of manufacture, comprising a data storage medium tangibly embodying a program of machine-readable instructions executable by a digital processing apparatus to perform a method for optically scanning an image of an object with an image scanning apparatus that includes an optical shutter comprising an LCD screen, the optical shutter having first and second faces and a plurality of individually activateable pixels therebetween comprising three arrays of individually activateable LCD pixels, the object being placed against a face of the optical shutter, each pixel having a first transparency when activated and a second transparency when not activated, the first and second transparencies being first and second colors respectively, the pixels of each of pixel array when un-activated having a different transparency than pixels of the other arrays when un-activated, the pixels of each of the three arrays when un-activated being respectively red, green, and blue, wherein said optical shutter presents image data by activating pixels of the plurality of pixels, said image scanning apparatus also including a light source positioned to direct light through the object and through non-activated pixels of the plurality of pixels, the light source being configured to project a pattern of light that evenly covers the first face of the LCD screen when not obstructed by any portion of the object, said image scanning apparatus also including an optical sensor for sensing light passing through the object and through corresponding non-activated pixels of the plurality of pixels, said image scanning apparatus also including a scanner controller comprising a microprocessor coupled to the optical shutter, the scanner controller also being coupled to the light source and to the optical sensor, the image scanning apparatus also including a storage unit communicatively coupled to the scanner controller, said method comprising:

placing the object against the first face of the optical shutter between the light source and the first face of the optical shutter;

operating the light source to direct light through the object and then onto the first face and through non-activated pixels of the plurality of pixels and through the second face, the light directed by the light source concurrently providing multiple wavelengths of light in a range visible to humans, the light source projecting a pattern of light that evenly covers the shutter when there is no object present, the light source being controlled by the scanner controller;

activating sequentially for the red, green, and blue arrays, substantially all of said pixels while leaving a contiguous grouping of one or more of said pixels of the color of the array being scanned un-activated and changing activation status of said plurality of pixels such that the grouping of un-activated pixels scans across the optical shutter in a predetermined two dimensional pattern systematically traversing an entire image area substantially corresponding with the second face of the optical shutter by moving the grouping of un-activated pixels at a predetermined speed;

concurrently with the activating step, operating the optical sensor to measure light from the light source passing through an area of the object and also passing through corresponding non-activated pixels of said plurality of pixels and exiting through the second face;

forwarding measurements of the measured light to the scanner controller for subsequent processing after scanning the image; and applying a scanning routine to process the image.

44. The article of manufacture of claim 43, the method further comprising placing the optical sensor against the LCD screen, and wherein operating the optical sensor comprises producing an output signal proportional to the sum of all light striking the entire single sensing area of a monolithic sensor having a single sensing area, the single sensing area having substantially the same shape and size as the second face of the optical shutter, and wherein the grouping of un-activated pixels is scanned across the optical shutter in a raster pattern, and wherein the optical shutter, light source, optical sensor, scanner controller, and storage unit are components of a laptop computer, with the light source being the backlight of the laptop computer.

45. The article of manufacture of claim 44, wherein the grouping of pixels that is left unactivated comprises a single pixel, and wherein the storage unit is a RAM, and wherein the single sensing area of the monolithic sensor comprises a solar cell, and further comprising the step of coupling the scanner controller to the optical sensor with a PCMCIA card.

46. The article of manufacture of claim 43, wherein operating the optical sensor comprises:

collecting light passing through the object and the unactivated pixels with a light collector having a light collecting area having substantially the same shape and size as the second face of the optical shutter, with the light collector being positioned adjacent the second face, the light collector comprising at least one waveguide for guiding light collected by the light collector; and sensing light transmitted through at least one waveguide with at least one light sensing element, the optical sensor having at least one light sensing element.

47. The article of manufacture of claim 46, wherein the grouping of pixels that is left unactivated comprises a single pixel, and wherein the storage unit is a RAM, and wherein the optical sensor has a single photodiode, and further comprising the step of coupling the scanner controller to the optical sensor with a ribbon cable.

48. The article of manufacture of claim 43: wherein:

the grouping of un-activated pixels is multiple pixels cooperatively forming a rectangle;

the optical shutter, light source, optical sensor, scanner controller, and storage unit are components of a laptop computer, with the light source being the backlight of the laptop computer;

the storage unit is a RAM;

the optical sensor is a monolithic sensor comprising a plurality of concentrically configured tracks that are divided into pie-shaped sectors, with each sector comprising a pyroelectric sheet;

and the method further comprising:

placing the optical sensor against the LCD screen;

coupling the scanner controller to the optical sensor with a PCMCIA card; and sequentially activating, with the scanner controller, the pyroelectric sheet nearest the scanning cursor and deactivating all of the other pyroelectric sheets.

49. The article of manufacture of claim 48, said step of operating the optical sensor further comprising the steps of:

for each region of the optical shutter having a size corresponding to the non-activated pixels, operating the optical sensor to measure light from the source passing through the region and the second face and the object and generating an output signal representative of the measured light;

summing each output signal with output signals from a predetermined group of other regions to generate a summed signal, the predetermined group of other regions consisting of a predefined number of other regions; and dividing the summed signal by the predefined number plus one.

50. The article of manufacture of claim 49, wherein the predefined number of other regions are located immediately above, to the right, and to the top-right of the region, and where the summed signal is divided by four.

51. The article of manufacture of claim 43: wherein:

the grouping of un-activated pixels is multiple pixels cooperatively forming a rectangle;

the optical shutter, light source, optical sensor, scanner controller, and storage unit are components of a laptop computer;

the storage unit is a RAM;

the optical sensor is a monolithic sensor comprising a plurality of concentrically configured tracks that are divided into pie-shaped sectors, with each sector comprising a thin-film sensing element;

and further comprising:

disconnecting a backlight from the LCD screen;

replacing the backlight with the optical sensor;

coupling the scanner controller to the optical sensor with a PCMCIA card; and sequentially activating, with the scanner controller, the thin-film sensing element nearest the scanning cursor and deactivating all of the other thin-film sensing elements.

52. The article of manufacture of claim 43, the operating step comprising projecting an image upon the optical shutter.

* * * * *